United States Patent
Shupe

[11] 3,749,475
[45] July 31, 1973

[54] COHERENT OPTICAL DEVICE UTILIZING AN ORGANIC DYE CELL TO DESTROY THE COHERENCE OF A WAVE ENERGY SIGNAL

[75] Inventor: David M. Shupe, Troy, Mich.

[73] Assignee: The Bendix Corporation, Southfield, Mich.

[22] Filed: July 21, 1972

[21] Appl. No.: 274,018

[52] U.S. Cl.............. 350/160 R, 307/88.3, 350/3.5, 350/162 SF
[51] Int. Cl. ............................................. G02f 1/00
[58] Field of Search ........... 350/3.5, 160 R, 162 SF; 307/88.3

[56] References Cited
UNITED STATES PATENTS
3,542,452   11/1970   Gerritsen et al. ................... 350/3.5
3,547,509   12/1970   Brandes ............................. 350/3.5
3,629,602   12/1971   Firester.................... 350/162 SF UX Primary Examiner—Edward S. Bauer
Attorney—John S. Bell et al.

[57] ABSTRACT

An image correlator in which a beam of laser light is projected through two aligned, partially transparent images, and in which the intensity of the beam downstream from the two images is measured to determine image correlation is described herein. A thin organic dye cell is disposed between the two images to destroy the coherency of the laser beam and thereby decrease the effect that slight variations in image alignment will have on correlation measurements. The organic dye cell destroys beam coherence very effectively, is inexpensive, convenient to use, and is also inherently faster than a rotating ground glass element which is used in prior art correlators to destroy beam coherence.

2 Claims, 1 Drawing Figure

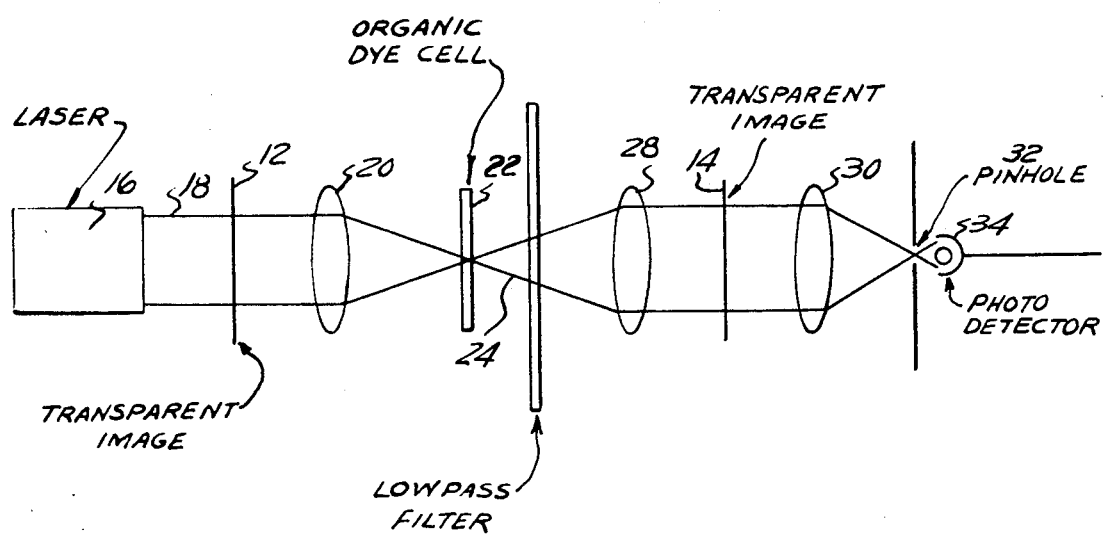

COHERENT OPTICAL DEVICE UTILIZING AN ORGANIC DYE CELL TO DESTROY THE COHERENCE OF A WAVE ENERGY SIGNAL

BACKGROUND OF THE INVENTION

1. Field of the Invention

Apparatus for destroying the coherency of a wave energy signal in optic systems utilizing coherent wave energy but requiring the conversion of a coherent signal to an incoherent signal at some point.

2. Brief Description of the Prior Art

A coherent wave energy signal is a signal such as a laser signal in which all points on the propagating wavefront are in phase with each other. There are a number of optical systems in which it is necessary to destroy this phase coherence, or in other words convert the coherent wave energy signal to an incoherent wave energy signal. For example, optical correlators are known in which a beam of coherent laser light is projected toward two aligned, partially transparent images. Correlation is determined by providing a Fourier transform of the beam between the two images and measuring beam intensity at a point downstream from the two images. The beam of coherent laser light is converted to an ordinary or incoherent beam at a point between the two images to reduce the effect that a slight misalignment of the two images would have on an output correlation measurement. If this conversion were not made, image alignment would be very critical and any slight misalignment would produce a great change in the measured correlation between the images.

In order to convert the coherent beam to an incoherent beam, a dispersive ground glass plate is disposed between the two images and rotated so that the coherent beam is scanned across its surface. The ground glass has surface irregularities with depths of about one wavelength of coherent wave energy. The lengths of the paths through the glass for each ray of the beam vary as the glass element is rotated to move the beam across these surface irregularities. This path length variation causes the various beam rays to interfere with each other and thereby destroys beam coherence.

The use of a rotating ground glass element to convert a coherent signal to an incoherent one has a number of drawbacks. First, it is difficult to make a ground glass plate that does an adequate job of destroying phase information. The plate must be carefully made to be uniformly dispersive over its entire surface so that distortions will not be induced into any portion of the beam. Second, rotation of the glass plate is inconvenient and requires the incorporation of additional structure into the correlator. And third, the requirement to rotate the plate establishes a limit to the rate at which correlation measurements can be made. The time interval during which a correlation measurement is made must be sufficiently long to allow the path length through the glass plate of each beam ray to vary through several cycles so that an average interference value is achieved at each point in the beam cross section downstream from the glass element. Achieving an average interference value insures that no distortions are introduced by either total destructive or total constructive interference occurring at any point.

SUMMARY OF THE INVENTION

This invention utilizes an organic dye material to provide a simple and convenient conversion of a coherent wave energy signal to an incoherent signal that is inherently faster than a rotating ground glass element. An optical correlator similar to that described above is illustrated herein in which a thin organic dye cell is placed between the two images being correlated to receive the coherent wave energy signal and convert that signal to an incoherent signal. An organic dye cell comprises a transparent housing containing an organic dye material dissolved in an appropriate solvent. The organic dye material absorbs the coherent wave energy signal striking the cell. However, organic dye responds only to the intensity of a received laser signal and is not sensitive to the phase of that signal. Because of this phase insensitivity characteristic of an organic dye, the coherence of a signal is destroyed as that signal is absorbed. The dye thus emits an incoherent signal having an intensity distribution proportional to the intensity of the distribution absorbed coherent signal.

The above-described drawbacks of the rotating ground glass prior art system are overcome by this invention. It is not difficult to obtain an organic dye cell that very effectively converts a coherent wave energy signal to an incoherent wave energy signal. Suitable organic dyes are commercially available and inexpensive. Since the organic dye is in solution, the cell responds uniformly to light striking different points on its surface, and therefore, does not introduce any signal distortions. In addition, it is convenient to convert a coherent signal to an incoherent signal with an organic dye cell because it is not necessary to scan or rotate any element. To convert a signal, it is only necessary that an organic dye cell having a sufficiently large signal receiving surface to receive the signal of interest be placed at the position at which it is desired to make the conversion. In addition, organic dye cells convert coherent signals to incoherent signals very rapidly. A typical dye absorbs a coherent signal and emits a corresponding incoherent wave energy signal in a time interval on the order of $5 \times 10^{-9}$ seconds. A dye cell incorporated into a correlator thus permits correlation measurements to be made very rapidly.

BRIEF DESCRIPTION OF THE DRAWING

Further objects, features and advantages of this invention, which is defined by the appended claims, will become apparent from a consideration of the following description and the accompanying drawing which is a schematic, two-dimensional side view of a single-beam image correlator that includes an organic dye cell for destroying the coherence of the beam.

DETAILED DESCRIPTION OF THE PREFERRED EMBODIMENT

FIG. 1 illustrates a correlator 10 for measuring the correlation between two partially transparent images 12 and 14 which might for example comprise alpha numeric characters recorded on transparent film. Correlator 10 includes a laser generator 16 which projects a beam 18 of laser light toward aligned images 12 and 14. A lens 20 is positioned downstream from image 12 to form the Fourier transform of beam 18 after it has been modulated by that image. Image 12 is located at the front focal plane of lens 20, and an organic dye cell 22 is located at the back focal plane of lens 20. Dye cell 22 comprises a transparent glass housing which contains a fluorescent organic dye that absorbs laser light of the wavelength of beam 18 and a liquid that dissolves the organic dye so that the material in the glass housing of cell 22 is a solution. Different organic dyes responsive to different color (wavelength) light signals are known and can be used in different embodiments of this invention. For example, in an embodiment of a correlator 10 in which beam 18 comprises a beam of green laser light, the organic dye in cell 22 would comprise some dye that absorbs green light. Rhodamine 6-G is an organic dye responsive to green light as well as to a number of other light wavelengths and can, therefore, be used in this and a great number of different embodiments. Methanol dissolves rhodamine 6-G and therefore can be used as the solvent or carrier in such an embodiment.

The organic dye of cell 22 absorbs coherent beam 18 and emits a corresponding incoherent beam 24. A low-pass filter 26 is positioned downstream from organic dye cell 22 to absorb any high frequency portion of beam 18 not absorbed by the organic dye and that would, therefore, still be coherent. A lens 28 is positioned to focus beam 24 onto the second image 14 which further modulates the beam, and a lens 30 is positioned downstream from image 14 to focus the beam onto a pinhole 32. A photodetector 34 is positioned to measure the intensity of light passing through pinhole 32 and thereby indicate image correlation.

In operation, images 12 and 14 are aligned with each other and illuminated with light from laser generator 16. Since image 12 is located at the front focal plane of lens 20 and organic dye cell 22 is located at the back focal plane of that lens, the distribution of beam 18 striking lens 22 is the Fourier transform of the amplitude and phase of light beam 18 just after it has passed through image 12. Organic dye cell 22 absorbs the light beam, but does not respond to the phase of a light beam and thus does not preserve the phase coherence of the beam. Cell 22 thus emits an incoherent beam 24 which corresponds to the power spectrum of modulated beam 18. Beam 24 is filtered and focused onto image 14, which image further modulates the beam. This further modulated beam is focused by lens 30 to pinhole 32. The intensity of light passing through pinhole 32 and striking photodetector 34 is a maximum when the two images are identical and decreases as the correlation between those images decreases.

Having thus described one embodiment of this invention, a number of modifications will readily occur to those skilled in this art. For example, an organic dye cell may be incorporated in many optical systems other than correlators to convert coherent signals to incoherent signals. As one example of another such system, in holography a speckle pattern is frequently observed when a beam of coherent laser light is directed to strike a hologram and provide a three-dimensional output image for an observer. The speckle pattern is caused in many systems by an interference between light transmitted directly through the observer's eye and light scattered at the aperture of the eye. The speckle pattern can be eliminated by placing an organic dye cell in an image plane of the hologram to destroy the coherence of the laser output signal.

Therefore, what is claimed is:

1. In an optical system including means for generating a coherent wave energy signal and requiring the conversion of said coherent signal to an incoherent signal, improved means for providing said conversion comprising:
   an organic dye material responsive to said coherent wave energy signal disposed to receive and absorb said coherent wave energy signal, said absorption destroying the coherence of said coherent signal and causing said dye material to emit an incoherent wave energy signal having an intensity distribution proportional to the intensity distribution of said coherent wave energy signal.

2. The optical system of claim 1 in which said organic dye material comprises an organic dye solution held in a transparent container.

* * * * *